United States Patent
Griffiths et al.

[11] 3,873,138
[45] Mar. 25, 1975

[54] QUICK DISCONNECT SEALED COUPLING

[75] Inventors: Edward J. Griffiths, Pekin; Lee R. Loyd, Peoria, both of Ill.

[73] Assignee: Caterpillar Tractor Company, Peoria, Ill.

[22] Filed: Oct. 19, 1972

[21] Appl. No.: 299,086

[52] U.S. Cl. ............... 285/233, 285/369, 285/403
[51] Int. Cl. ............................................ F16l 21/02
[58] Field of Search ........... 285/233, 369, 347, 403, 285/404; 287/113

[56] References Cited
UNITED STATES PATENTS

| | | | |
|---|---|---|---|
| 1,935,472 | 11/1933 | Kaminsky | 285/403 |
| 2,234,643 | 3/1941 | Grant | 285/369 |
| 2,532,773 | 12/1950 | Kellam | 285/233 |
| 2,831,711 | 4/1958 | Leadbetter | 285/403 |
| 3,198,559 | 8/1965 | Snyder | 285/233 |
| 3,370,870 | 2/1968 | Mahoff | 285/233 |
| 3,502,356 | 3/1970 | Schmunk | 285/347 |

FOREIGN PATENTS OR APPLICATIONS

| 39,091 | 9/1936 | Netherlands | 285/342 |
|---|---|---|---|

*Primary Examiner*—Paul R. Gilliam
*Assistant Examiner*—Alex Grosz
*Attorney, Agent, or Firm*—Phillips, Moore, Weissenberger, Lempio & Strabala

[57] ABSTRACT

The ends of two axially aligned conduits have a cylindrical sleeve mounted thereon. An O-ring seal is mounted in an annular groove formed on the end of each conduit to abut the sleeve in sealing contact. Each end of the sleeve has a pair of clip members attached thereto which cooperate with a shoulder formed on a respective one of the conduits to prevent the conduits from moving axially away from the sleeve.

2 Claims, 1 Drawing Figure

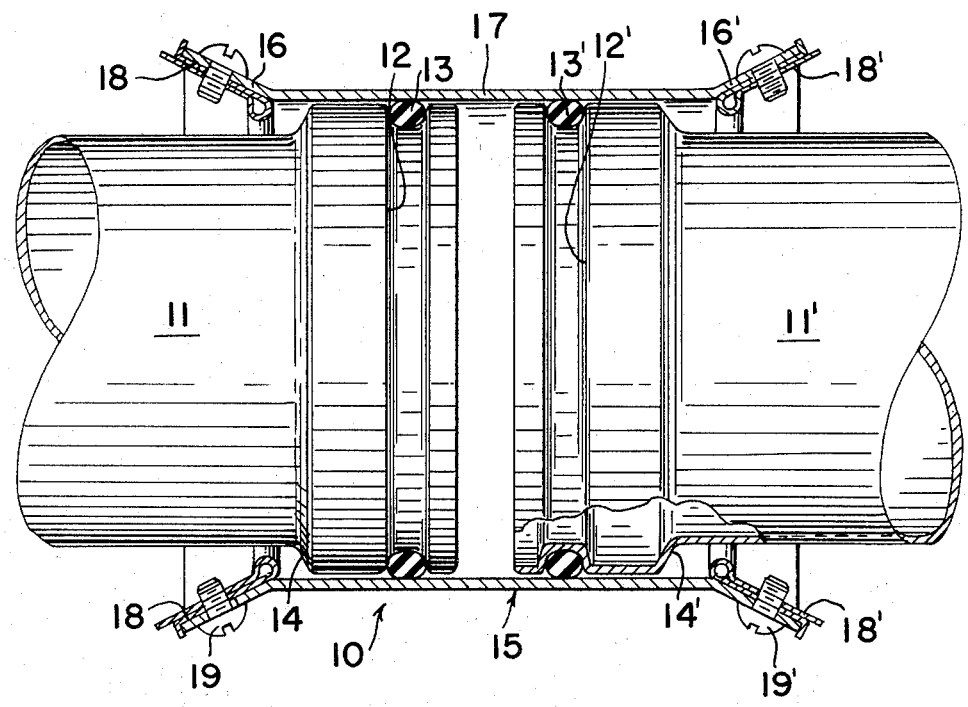

QUICK DISCONNECT SEALED COUPLING

BACKGROUND OF THE INVENTION

Conventional sealed couplings for releasably connecting the ends of axially aligned pipes together are oftentimes complex and expensive to manufacture. Such pipes may be required in marine engine applications, for example, wherein flexible hoses are prohibited due to their susceptibility to rupture. In addition to their quick-disconnect and sealing functions, the couplings must also function to permit a slight angular misalignment and linear displacement between the pipes and must withstand vibrational forces normally encountered during engine operation.

SUMMARY OF THIS INVENTION

An object of this invention is to provide a sealed coupling exhibiting the above-mentioned desiderata. The coupling comprises an annular sleeve surrounding the ends of axially aligned conduits and annular sealing means mounted on the end of each conduit to abut the sleeve in sealing contact. Cooperating stop means are positioned at the end of each of the conduits and on the sleeve for preventing the conduits from moving axially away from the sleeve.

BRIEF DESCRIPTION OF THE DRAWING

Other objects of this invention will become apparent from the following description and accompanying drawing which is a longitudinal sectional view of a sealed coupling detachably connecting axially aligned conduits together.

DETAILED DESCRIPTION

The drawing illustrates a sealed coupling 10 in combination with a pair of axially aligned conduits 11 and 11', preferably constituting rigid metallic pipes such as those employed for the water lines of a marine engine. The pipes have circumferentially extending grooves 12 and 12' formed externally on the ends thereof to respectively seat annular, elastomeric O-ring seals 13 and 13' therein. Annular shoulders 14 and 14' are also formed on the pipes for purposes hereinafter explained.

The coupling comprises an annular sleeve 15 having flared ends 16 and 16' extending axially outwardly from an intermediate cylindrically-shaped mid-portion 17 thereof. Lug means, preferably comprising diametrically opposed pairs of clip members 18 and 18', are releasably attached to inner surfaces of flated ends 16 and 16' by cap screws 19 and 19', respectively. The lug means or clip members provide cooperating stop means along with axially spaced shoulder means 14 and 14' for preventing the conduits from moving axially away from the sleeve. It can be seen that the pipes may be subjected to a slight angular misalignment and linear displacement, relative to each other, without disturbing the sealing contact provided at seals 13 and 13'.

What is claimed is:

1. A sealed coupling in combination with a pair of axially aligned conduits, said coupling comprising, a circumferentially formed groove in each external end of said conduits, an annular sleeve surrounding the ends of said conduits and being flared axially outwardly at each of its ends from an intermediate cylindrically shaped mid-portion of said sleeve, annular elastomeric sealing means mounted in each of said grooves to abut said sleeve in sealing contact, co-operating stop means positioned at the ends of each of said conduits and on said sleeve for preventing said conduits from moving axially away from said sleeve, said stop means comprising an annular downwardly tapered shoulder means formed on the end of each of said conduits inwardly of said grooves and lug means comprising clip members having at least one flat surface and an enlarged portion with said flat surface contigious to an inner surface of each respective flared end of said sleeve positioned in axially spaced relationship relative to a respective shoulder means, with the enlarged portion being disposed and extending into the sleeve and in the same plane of said annular shoulder whereby the same may engage one another upon axial displacement, and threaded fasteners extending through said flat surfaces and said inner surfaces for removably securing one to the other.

2. The combination of claim 1 wherein each of said conduits constitutes a rigid metallic pipe.

\* \* \* \* \*

UNITED STATES PATENT OFFICE
CERTIFICATE OF CORRECTION

PATENT NO. : 3,873,138
DATED : March 25, 1975
INVENTOR(S) : Edward J. Griffiths, et al It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co. ---.

Signed and Sealed this twenty-second Day of July 1975

[SEAL]

Attest:

RUTH C. MASON
Attesting Officer

C. MARSHALL DANN
Commissioner of Patents and Trademarks